United States Patent [19]
Connelly et al.

[11] Patent Number: 6,096,208
[45] Date of Patent: *Aug. 1, 2000

[54] SEAL ARRANGEMENT FOR SPIN-ON FILTERS

[75] Inventors: John F. Connelly, Chanhassen; Jeff J. Theisen, Prior Lake, both of Minn.

[73] Assignee: Donaldson Company, Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/916,755

[22] Filed: Aug. 19, 1997

[51] Int. Cl.⁷ .................................................. B01D 27/08
[52] U.S. Cl. .......................... 210/249; 210/443; 210/450
[58] Field of Search ..................... 210/440, 443, 210/444, 450, DIG. 17, 249; 248/94

[56] References Cited

U.S. PATENT DOCUMENTS

| | | | |
|---|---|---|---|
| 2,537,249 | 1/1951 | Walton | 210/444 |
| 3,067,880 | 12/1962 | Bowers et al. . | |
| 3,297,162 | 1/1967 | Mouwen . | |
| 3,334,754 | 8/1967 | Kudlaty | 210/444 |
| 3,529,722 | 9/1970 | Humbert, Jr. . | |
| 3,690,460 | 9/1972 | Lindboe | 210/443 |
| 3,822,787 | 7/1974 | Shaltis et al. . | |
| 3,847,819 | 11/1974 | Firth . | |
| 4,053,409 | 10/1977 | Kuhfuss, Jr. . | |
| 4,222,875 | 9/1980 | Sikula, Jr. . | |
| 4,364,825 | 12/1982 | Connor, Jr. . | |
| 4,369,113 | 1/1983 | Stifelman . | |
| 4,428,834 | 1/1984 | McBroom et al. . | |
| 4,446,019 | 5/1984 | Robinson . | |
| 4,480,160 | 10/1984 | Stifelman . | |
| 4,512,882 | 4/1985 | Fischer et al. . | |
| 4,522,712 | 6/1985 | Fischer et al. . | |
| 4,611,627 | 9/1986 | Eidsvoog et al. . | |
| 4,615,800 | 10/1986 | Stifelman et al. . | |
| 4,743,374 | 5/1988 | Stifelman . | |
| 4,832,844 | 5/1989 | Ayers . | |
| 4,834,885 | 5/1989 | Misgen et al. . | |
| 4,853,118 | 8/1989 | Brownell et al. . | |
| 4,872,976 | 10/1989 | Cudaback . | |
| 4,883,083 | 11/1989 | Fisher et al. . | |
| 4,935,127 | 6/1990 | Lowsky et al. . | |
| 4,990,247 | 2/1991 | Vandenberk . | |
| 5,037,539 | 8/1991 | Hutchins et al. . | |
| 5,104,537 | 4/1992 | Stifelman et al. . | |
| 5,342,519 | 8/1994 | Friedmann et al. . | |
| 5,395,518 | 3/1995 | Gulsvig . | |
| 5,501,791 | 3/1996 | Theisen et al. . | |

FOREIGN PATENT DOCUMENTS

| | | | |
|---|---|---|---|
| 1091222 | 11/1967 | United Kingdom | 210/444 |
| WO 95/11072 | 4/1995 | WIPO . | |

*Primary Examiner*—Matthew O. Savage
*Attorney, Agent, or Firm*—Merchant & Gould P.C.

[57] ABSTRACT

A seal arrangement for fluid filters is provided. The seal arrangement generally concerns compressing a gasket between selected portions of the filter base and filter cartridge. A preferred frusto-conical configuration is provided, to advantage. Methods of assembly and use are described, as well as preferred filter base configurations and preferred filter cartridge configurations.

17 Claims, 2 Drawing Sheets

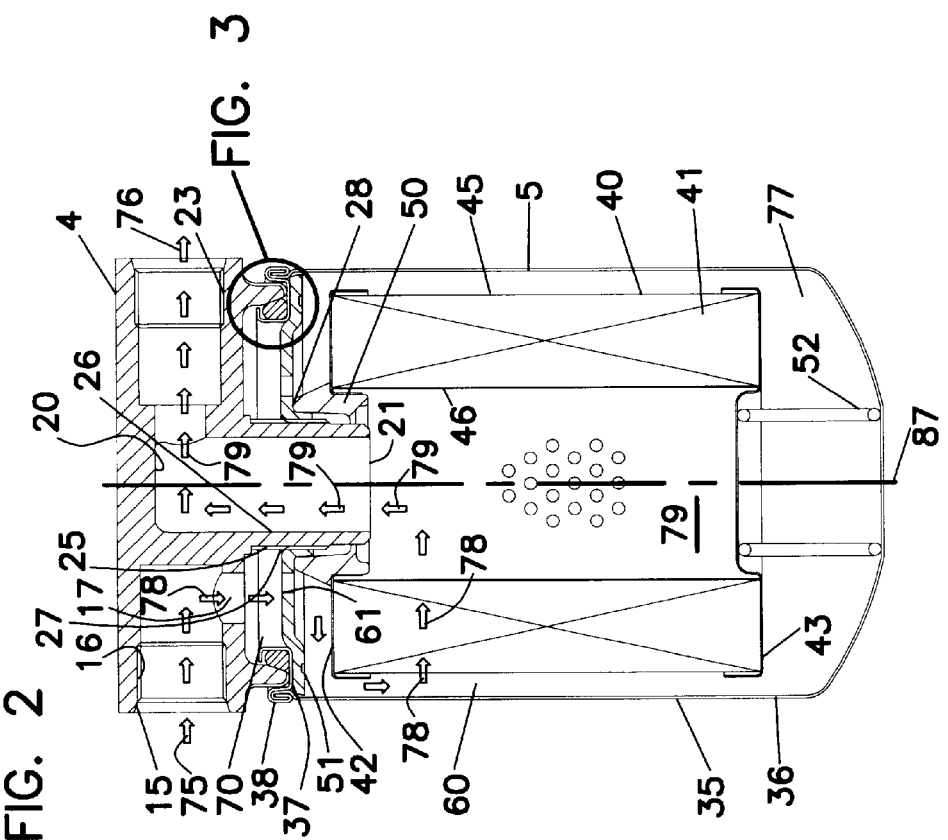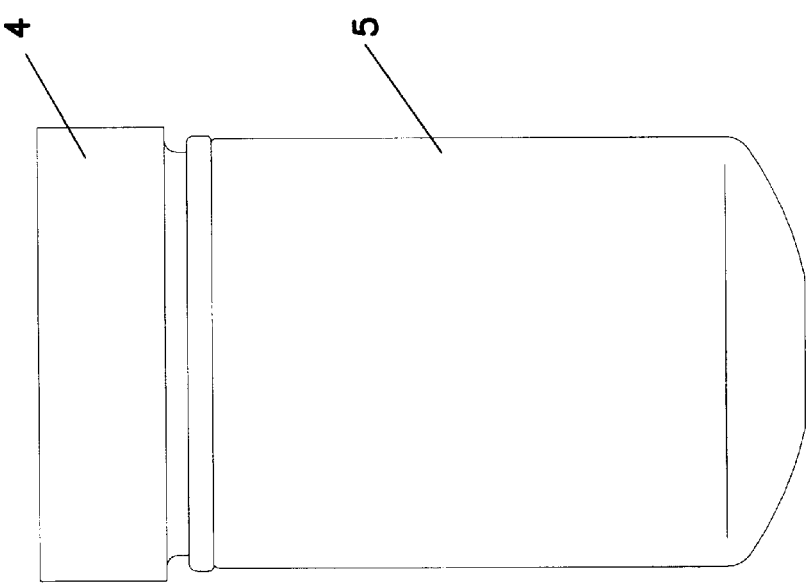

SEAL ARRANGEMENT FOR SPIN-ON FILTERS

FIELD OF THE INVENTION

The present invention relates generally to fluid filters. In certain particular embodiments shown it relates to fluid filters of the spin-on type. More particularly, the invention relates to a seal formed between spin-on filter cartridges and a filter base, when the filter cartridge is mounted on the base. Methods of accomplishing a preferred seal are provided.

BACKGROUND OF THE INVENTION

Spin-on filter arrangements have been employed in a variety of applications including, for example, hydraulic systems, fuel systems and lubrication systems. Such filter arrangements generally include a filter element positioned within a can, casing or housing having a cover or top plate at one end thereof, by which the filter can be mounted on a filter head or filter base. A central opening and several surrounding openings in the cover are usually provided to direct flow through the filter and filter element therein, which flow can be in either an inside/out (reverse flow) or an outside/in (forward flow) pattern. A circular gasket on the outside of the cover serves as an external seal between the filter and the filter head. A gasket (or combination of gaskets) on the inside of the cover functions as an internal seal between portions of the filter element and the cover. Spin-on filters are typically intended to be used for a limited period, with follow-up removal and replacement during servicing.

Herein the combination of can, element and other components which are "spun" or otherwise mounted onto the filter base will sometimes be referred to as the removable and replaceable filter cartridge or cartridge assembly.

A variety of conventional arrangements have been used to provide for sealing engagement with respect to fluid flow outwardly from between the filter base and the cartridge. Many of these have concerned positioning an o-ring, compressed, axially, between the two as the filter cartridge is spun onto the filter base. Examples of these are shown: in U.S. Pat. No. 4,969,994, FIG. 1 at 7 and FIG. 3 at 134; in U.S. Pat. No. 4,369,113 in FIG. 2 at 44; and, in U.S. Pat. No. 4,743,374 in FIGS. 2 and 5, at 46. The complete disclosures of the previously mentioned '994, '113 and '374 patents are incorporated herein by reference.

Reliability and durability of the seal between the liquid filter and the filter head is important. Significant leakage of the fluid being filtered during operation can result in catastrophic damage to the engine, vehicle component, or other equipment and component involved.

SUMMARY OF THE INVENTION

According to certain aspects of the present invention, a filter assembly is provided. The filter assembly comprises: a filter base; a removable and replaceable filter cartridge mounted on the filter base; and, a sealing gasket pressed between the filter base and the filter cartridge. The filter base generally includes an inwardly directed (typically radially inwardly directed) sealing surface, preferably frusto-conical in configuration. By the term "radially" inwardly directed inches in this context, it is meant that: the sealing surface is circular in configuration; and the sealing surface circumscribes and is directed toward a central axis. By the term "frusto-conical" in this context, it is meant that the sealing surface has a flat portion in cross-section (viewed in a plane having the central axis therein), and thus defines a frusto-conical surface. In general, the preferred arrangement is constructed and arranged such that the sealing gasket is compressed between the frusto-conical sealing surface and a gasket seat on the filter cartridge.

Preferably the frusto-conical sealing surface has a flat portion, in cross-section, having a width within a range of 0.100 inches to 0.750 inches. Also preferably this flat portion of the frusto-conical sealing surface extends at an angle of about 85° to about 45°, relative to a plane perpendicular to a center line (center axis) of the frusto-conical sealing surface.

In the preferred assembly, the gasket has a generally circular cross-section. Thus, the gasket is preferably an o-ring with a circular cross-section.

In the typical embodiment shown, the filter cartridge includes an end wall piece having: a center recess or recess portion; an outer wall; and, an inner wall, with the center recess and inner wall defining the gasket seat against which the o-ring is compressed. Generally the center recess extends between the inner and outer walls, with the inner and outer walls being generally axially directed in extension from the recess, i.e., the inner and outer wall project generally toward the filter base, during assembly.

Preferably the filter base includes a center post, of circular cross-section (viewed in a plane perpendicular to the center line), with external threads thereon and the filter cartridge includes an internally threaded bore sized and configured to be threadibly received on the center post. Thus, in preferred embodiments, the filter cartridge is a spin-on filter, which is mounted onto the filter base by being threaded thereon. The compression of the gasket, then, to form the seal occurs as a result of the act of threading (or mounting); i.e., drawing of the cartridge toward the filter base.

Preferably the filter base includes a skirt structure or wall structure, constructed and arranged to directly contact a portion of the center recess in the cartridge end wall piece, when the filter cartridge is mounted on the filter base. Thus, preferably when a spin-on filter is involved, the spinning is conducted until a selected rigid portion of the filter base comes into direct contact with a selected rigid portion of the filter cartridge, providing a "hard stop" to the mounting. This helps avoid guesswork of appropriate levels of compression of the gasket. In the immediate location of the arrangement where the "stop" takes place, the gasket is not positioned between the two contacting pieces. Of course, the gasket is compressed between the frusto-conical sealing surface and the filter cartridge. However where the "hard stop" occurs, preferably the filter base wall structure directly contacts or abuts the filter cartridge.

In a preferred embodiment, the filter base wall structure includes an outer rim with a plurality of protrusions or projections thereon, each one of the plurality of protrusions projecting in a direction toward and into direct contact with a center recess in the filter cartridge end wall piece, when the filter cartridge is operably mounted on the filter base. By "operably mounted" in this context, it is meant that the assembly is configured for use. Of course, when protrusions of the type described in this paragraph are used, it is the protrusions which provide the hard stop against the filter cartridge.

In preferred embodiments, the base wall structure includes an inner wall portion, and the frusto-conical sealing portion comprises a portion of the base wall structure inner wall portion. That is, both the protrusions providing for the hard stop and the frusto-conical sealing surface are positioned on the same base wall structure, but in different locations, in certain preferred embodiments.

Preferably, the filter base comprises a metal casting, for example aluminum, magnesium, zinc; sand cast or die-cast. The filter cartridge is preferably a liquid filter. The filter cartridge may be either a forward flow filter or a reverse flow filter. Typical applications of the assembly are as a hydraulic, engine lube, fuel, or coolant filter on internal combustion engines.

Also according to the present invention, a filter base is provided. The filter base is generally one which is usable to form an assembly of the type described previously. The filter base, then, would generally comprise a center post having a threaded outer surface; and, a base wall circumscribing the center post and spaced therefrom. The base wall preferably has, on an inner portion thereof and directed toward the center post, a frusto-conical sealing surface. The frusto-conical sealing surface preferably has a flat portion, in cross-section, of the type described above. Also, the base wall preferably includes a plurality of protrusions of the type described above, for use to form the hard contact as described.

Also according to the present invention, a preferred filter cartridge is provided. The filter cartridge preferably has an end piece including a center recess positioned between an axially directed outer wall and an axially directed inner wall. Also, preferably a seal gasket is positioned on the filter cartridge, circumscribing the axially directed inner wall and nested against the center recess and axially directed inner wall. In such arrangements, preferably the axially directed inner wall includes a flange extending over at least a portion of the seal gasket. This flange, in conjunction with the axially directed wall and recess, will form a nest for the gasket, and will protect the gasket during shipment, handling and assembly.

According to the present invention, a method of sealing a filter cartridge to a filter base is provided. Generally, the method concerns mounting a filter cartridge onto a portion of a filter base while compressing a seal gasket therebetween. Preferably constructions as described hereinabove are used.

BRIEF DESCRIPTION OF THE DRAWINGS

FIG. 1 is a side elevational view of a filter element and filter base combination, having a seal according to the present invention incorporated therein;

FIG. 2 is a partially schematic cross-sectional view taken generally along line 2—2, FIG. 1;

DETAILED DESCRIPTION OF THE PREFERRED EMBODIMENT

Figure 3:
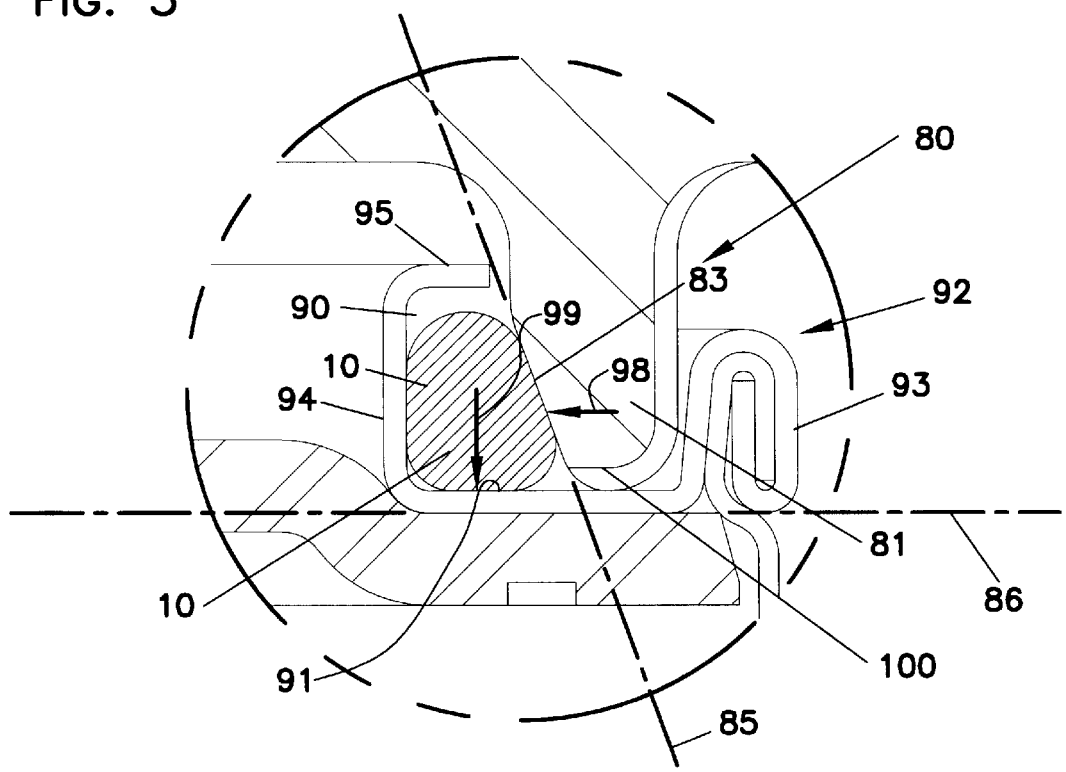
FIG. 3 is an enlarged fragmentary cross-sectional view of a portion of the arrangement shown in FIG. 2.

I. Some Problems with Conventional Arrangements.

In many instances, fluid filter arrangements are engine mounted, or are otherwise mounted on moving, vibrating machinery, and as such are exposed to significant vibration and shock during normal machine operation. Many of the seal systems designed for conventional spin-on filters are designed in a fashion that relies on a face sealing gasket to provide sealing of the contained fluid. The gasket may also serve as a vital structural component in the assembly to the filter base, providing a bearing surface to the filter base that provides rigidity to the assembly.

Reliance on an elastomer for a rigid interface can be problematic. For example, when exposed to vibration and shock, the gasket flexes and can suffer pinching or other damage and material fatigue due to excessive stress in the material. This can result in significant leakage that can lead to catastrophic failure in the system.

Another related problem concerns the installation method generally associated with a face sealing type gaskets. Typically, proper installation is specified as turning the filter until the gasket contacts the seal surface, and then further tightening a specified fraction of a turn. In some instances, during servicing, the filter is not tightened adequately because there is no fixed point of reference for consistently determining the proper fraction of a turn. Evenly spaced marks around the circumference are usually provided as a visual reference, but are an unreliable means of ensuring proper installation.

II. FIGS. 1–5.

The reference numeral 1, FIG. 1, generally designates an assembly according to the present invention comprising a filter base 4 (sometimes referred to as the filter head); a removable and replaceable filter or filter cartridge 5; and, a seal ring, not shown in FIG. 1, appropriately positioned between the filter cartridge 5 and filter base 4 to cause a seal therebetween. The filter ring is shown in FIG. 2 at reference numeral 10.

Still referring to FIG. 1, in general, assembly 1 is installed for use to filter a fluid in a mechanical system, for example, a hydraulic fluid system on construction equipment or a lubricating fluid system on a vehicle (truck, wheel loader) or associated with an engine or some other form of equipment (for example engine-powered stationary). The filter base 4 in such assemblies 1 is generally mounted semi-permanently to the equipment. Filter cartridge 5, on the other hand, is an item designed to be regularly serviced, typically by replacement. In general, the filter cartridge 5 is of a limited lifetime and is removed and replaced, during routine servicing of the equipment.

Attention is now directed to FIG. 2. FIG. 2 is a cross-sectional view taken generally along line 2—2, FIG. 1. FIG. 2 is somewhat schematic in its presentation, for simplicity and clarity.

Referring to FIG. 2, filter base 4 generally comprises a seamless casting, typically metal, for example an aluminum casting, machined for appropriate features. Referring to FIG. 2, filter base 4 includes fluid flow inlet aperture 15 and internal fluid inlet conduit 16, terminating in outlet 17. In addition, filter base 4 includes fluid flow outlet conduit 20 defined as extending between inlet aperture 21 and outlet aperture 23. Filter base 4 includes central mounting post 25 thereon, typically circular in horizontal cross-section relative to FIG. 2, defining a portion 26 of conduit 20 extending therebetween; and, having, on an exterior surface 27 thereof, mounting threads 28 for filter cartridge 5.

Referring still to FIG. 2, attention is now directed to filter cartridge 5. Filter cartridge 5 includes: outer can or housing 35 defined by wall 36 and cover flange (or end flange) 37; internally received filter construction 40, generally defined by filter media 41 extending between upper and lower end caps 42 and 43, respectively, and positioned between outer and inner liners 45 and 46, respectively; internal gasket 50; cover piece 51; and, internal spring 52. In the housing 35, wall 36 and flange 37 are secured to one another along roll seam or peripheral seam 38.

In operation, fluid to filtered is directed into region 60 by passage through aperture 61 in cover 51. That is, fluid flow through inlet conduit 16 is directed into space 70 between cartridge 5 and filter base 4, and then either under pressure applied in the direction of arrow 75 or under suction draw in the direction of arrow 76, the fluid is directed into region 70, through aperture 61, and into region 60. Fluid flow is then directed through filter construction 40, in the direction generally indicated by arrows 78, into internal volume 79 defined by inner liner 46. After having been thus filtered, the fluid flow is then directed into conduit section 26 in central post 25, in the general direction indicated by arrow 79, through conduit 20 and outwardly from the filter base 4 in the direction indicated generally by arrow 76. Selected specific conduit sizes and shapes in filter base 4 are used to accommodate couplings and to facilitate fluid flow.

An arrangement constructed with fluid flow as shown in FIG. 2, i.e., from an exterior or outer liner 45 through to inner liner 46, during filtering, is generally referred to as a "forward flow" arrangement. It is noted that seal arrangements as defined herein can also be used in association with various "reverse flow" arrangements, in which fluid flow moves in an opposite direction through filter arrangement 40; i.e., from an interior to an exterior of the filter media.

Within the volume 77 defined by outer side wall construction 35 is included a spring 52 which biases filter arrangement 40 against gasket 50, and, as a result, gasket 50 against cover 51. As a result of this biasing, and configuration of gasket 50, a seal to inhibit filter flow between both of: gasket 50 and post 25; and, gasket 50 and end cap 42, is provided.

As thus far defined, filter cartridge 5 and filter base 4 are generally conventional. Arrangements and features such as those described in U.S. Pat. Nos. 4,369,113 and 4,743,374, incorporated by reference, can be used, for example, in analogous manners.

The present disclosure concerns unique features provided in association with a specific seal between base 4 and filter cartridge 5, as will be best understood by reference to FIG. 3, an enlarged view of a portion of FIG. 2.

Referring to FIG. 3, filter base 4 includes a depending or projecting wall structure (or skirt structure) 80 thereon. In the embodiment shown, structure 80 is a ring-shaped wall structure 81 which depends (projects) from filter base 4 in direction toward filter cartridge 5. Structure 81 circumscribes, and is spaced from, post 25.

Ring-shaped wall structure 81 includes radially, inwardly directed sealing surface 83. By the terms "radially" and "inwardly" in this context, it is meant that sealing surface 83 as it circumscribes post 25, is directed toward (i.e., faces) post 25 and/or center line or axis 87; center axis 87 being generally a central axis of circular symmetry for sealing surface 83.

In the preferred embodiment, sealing surface 83 possesses the following features: it is machined to be generally flat in cross-section, FIG. 3 over an extension of width; and, it is frusto-conical in configuration, with a line such as line 85 tangential to the surface 83 extending at an angle of about 85° to 45° relative to a plane (or line) such as a plane including line 86 perpendicular to central axis 87, FIG. 2, of central post 25.

Still referring to FIG. 3, filter gasket 10 is nested within a circular or annular recess 90 defined by a portion of can end 37. In particular, can end 37 includes a segment or end wall piece 92 defining a recess between outer wall 93 and inner wall 94. Seal ring 10 is configured to nest against inner wall 94. That is, seal ring 10 abuts, and circumscribes, inner wall 94. Note that inner wall 94 includes upper flange 95. Upper flange 95 is preferably of a sufficient size to extend partially, but not completely, typically no more than about 95% and usually about 75 to 90%, over seal ring 10.

For the preferred construction shown, sealing surface 83 is configured and directed to engage ring 10 compressing same against portions of wall 94 and a base surface 91, FIG. 3, as filter cartridge 5 is mounted on base 4, for example by being spun onto threads 28, FIG. 2. The directions of compression are indicated generally by arrows 98, 99, FIG. 3, and include both a radial and axial character (or component). That is, the compressive forces are partly axial and partly radial. Note, however, that in the preferred embodiment shown no portion of seal gasket 10 is compressed between and against end surface 100 of structure 80 and cartridge 5, during sealing. In addition, during sealing, structure 80 is positioned between seal gasket 10 and outer wall 93. This is a preferred configuration, for reasons stated hereinbelow.

Figure 4:
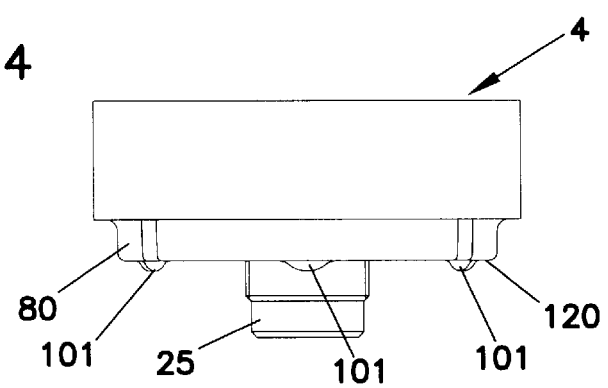
FIG. 4 is an enlarged side elevational view of a filter base similar to the one shown in the assembly of FIG. 1; and, FIG. 5 is a bottom plan view of the filter base shown in FIG. 4.
Figure 5:
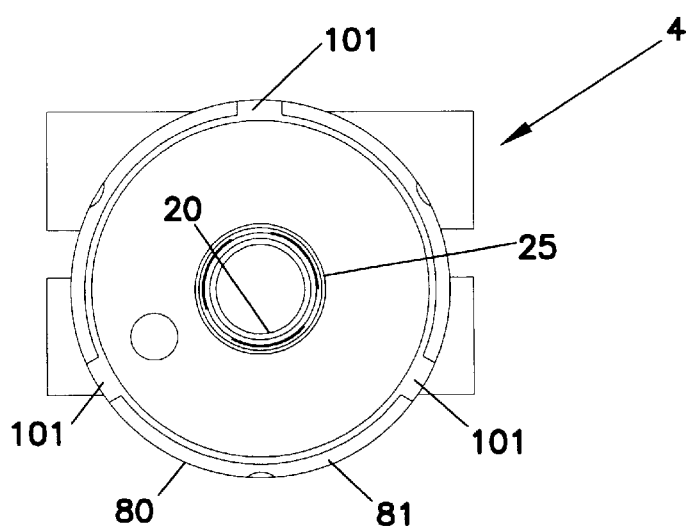

Referring to FIGS. 4 and 5, end surface 120 of wall 80 includes a plurality of spaced projections or protrusions 101 depending downwardly therefrom. In the specific embodiment shown, three radially evenly spaced (i.e., spaced 120° apart) protrusions 101 are shown. Each protrusion preferably projects a distance of about 0.010 inches to 0.100 inches from surface 120 in a direction toward cartridge 5 (when assembled). The protrusions 101 are preferably also a part of the cast of filter base 4.

Referring to FIG. 3, the protrusions 101 are sized and configured to provide a "hard" stop to movement of the filter cartridge 5 toward filter base 4, during mounting. Preferably the total surface area of the protrusions 101 which engages filter cartridge 5 is no greater than about 0.03 to 0.10 sq. inches for each protrusion; and, preferably the total number of protrusions is between 3 and 6. This will ensure that the surface area of contact will be relatively small, and thus will be relatively easy to obtain and to dislocate.

As a result of the configuration shown, a good control over mounting is obtained. The filter cartridge 5 is spun (mounted) onto base 4 until the stop (preferably a hard stop as described) is encountered. That is, preferably a rigid engagement between the cartridge 5 and the filter base 4 is obtained, when filter can end 37 engages protrusions 101. If the appropriate combinations of sizes of protrusions, gasket and seal surfaces is chosen, a good seal is obtained. This is because sealing surface 83 is directed toward ring 10 in such a manner that as the protrusions 101 are brought into contact with a surface, for example, a bottom surface of the annular recess 90, seal 83 compresses ring 10 in the direction indicated by arrows 98, 99, FIG. 3. A fluid tight seal is thus attained by simply choosing appropriate dimensions for the various portions. In sections presented hereinbelow, sample dimensions are provided. From these, a wide variety of alternate sizes and configurations can be readily developed.

Sample Specifications

In this section, an example is provided of a set of operating materials and specifications. These are intended as an example. A wide variety of alternate materials and sizes can be used.

The specific example is for use as a fuel filter. The filter base 4 would be cast from aluminum in the configuration shown in FIGS. 1–5. The dimensions would be generally as follows:

The housing 5 is constructed from steel. The housing 5 has an outer diameter of about 4.25 inches, and a length of about 7.00 inches. The outlet tube of the filter base 4 has an average inner diameter of about 1.00 inches.

The filter media includes a media made from cellulose or synthetic fiber. This media has an efficiency of about 50% or 5 micron particles and a typical life of about 250–500 service hours. Installed in the arrangement of FIG. 1, the media has an outside diameter of about 3.75 inches, and an inside diameter of about 1.75 inches.

End caps on the filter element are constructed from steel. End cap 42 has an outer diameter of about 3.80 inches, and an inner diameter of about 1.70 inches. End cap 43 has an outer diameter of about 3.75 inches.

Spring 52 is a coil spring with about 4 coils. In an uncompressed state, spring 52 has a length of about 1.50 inches, a diameter of about 1.50 inches, and is constructed from spring steel. Spring 52 has an installed force of about 30 pounds.

Wall structure 81 has an inner diameter of about 3.30 inches and an outer diameter of about 3.84 inches. It has a length of about 0.45 inches.

Surface 83 is at an angle from surface 86 of about 70°. The seal member includes a hardness measurement of about 70 durometer.

Upper flange 95 has a width of about 0.08 inches. Inner wall 94 has a length of about 0.300 inches.

Protrusions 101 project a distance of about 0.04 inches from surface 120.

What is claimed is:

1. A filter assembly comprising:
   (a) a filter base including a frusto-conical sealing surface and a center post with external threads thereon surrounding a center line of a base wall, said sealing surface directed toward said center post;
      (i) said frusto-conical sealing surface having a flat portion, in cross-section, having a width within the range of about 0.1 inches to about 0.75 inches;
         (A) said flat portion, in cross-section, of said frusto-conical sealing surface extending at an angle of about 85° to 45°, relative to a plane perpendicular to said center line of said filter base;
   (b) a removable and replaceable filter cartridge mounted on said filter base; said filter cartridge including a gasket seat thereon;
      (i) said filter cartridge including an end wall piece having an annular recess defined by a base surface and between a first wall surrounding a second wall, wherein said annular recess defines said gasket seat;
         (A) said filter base including a base wall structure constructed and arranged to directly contact the base surface of said annular recess in said end wall piece, when said filter cartridge is mounted on said filter base; said base wall structure including a rim with a plurality of protrusions thereon; each one of said plurality of protrusions projecting into said annular recess in said end wall piece and contacting said base surface, when said filter cartridge is operably mounted on said filter base;
      (ii) said filter cartridge including an internally threaded bore sized and configured to be threadibly received on said center post; and
   (c) a sealing gasket compressed between said frusto-conical sealing surface and said gasket seat.

2. A filter assembly according to claim 1 wherein:
   (a) said base wall structure includes an inner wall portion facing towards said center post;
      (i) said frusto-conical sealing portion comprising a portion of said inner wall portion.

3. A filter assembly according to claim 2 wherein:
   (a) said filter base comprises a metal casting.

4. A filter assembly according to claim 3 wherein:
   (a) said filter cartridge comprises a liquid filter having an exterior portion and an interior portion, whereby liquid to be filtered flows in a direction from said exterior portion to said interior portion.

5. A filter assembly according to claim 1 wherein:
   (a) said angle is 70°.

6. A filter assembly according to claim 1 wherein:
   (a) said protrusions project about 0.01–0.1 inches from said rim.

7. A filter assembly according to claim 6 wherein:
   (a) said protrusions project about 0.04 inches from said rim.

8. A filter assembly according to claim 1 wherein:
   (a) said rim includes no more than 6 protrusions.

9. A filter assembly comprising:
   (a) a filter base including frusto-conical sealing surface and a center post with external threads thereon surrounding a centerline of a base wall, said sealing surface directed towards said center post;
      (i) said frusto-conical sealing surface having a flat portion;
         (A) said flat portion extending at an angle relative to a plane perpendicular to said center line of said filter base;
   (b) a removable and replaceable filter cartridge mounted on said filter base; said filter cartridge including a gasket seat thereon;
      (i) said filter cartridge including an end wall piece having an annular recess defined by a base surface and between a first wall surrounding a second wall, wherein said annular recess defines said gasket seat;
         (A) said filter base including a base wall structure constructed and arranged to directly contact the base surface of said annular recess in said end wall piece, when said filter cartridge is mounted on said filter base; said base wall structure including a rim with a plurality of protrusions thereon; each one of said plurality of protrusions projecting into said annular recess in said end wall piece and contacting said base surface, when said filter cartridge is operably mounted on said filter base; and
   (c) a sealing gasket compressed between said frusto-conical sealing surface and said gasket seat.

10. A filter assembly according to claim 9 wherein:
    (a) said frusto-conical sealing surface, in cross-section, has a width within the range of about 0.1 inches to about 0.75 inches.

11. A filter assembly according to claim 9 wherein:
    (a) said angle is about 85° to 45°.

12. A filter assembly according to claim 11 wherein:
    (a) said angle is 70°.

13. A filter assembly according to claim 9 wherein:
    (a) said filter cartridge includes an internally threaded bore sized and configured to be threadibly received on said center post.

14. A filter assembly according to claim 9 wherein:
    (a) said base wall structure includes an inner wall portion facing towards said center post;
       (i) said frusto-conical sealing portion comprising a portion of said second wall.

15. A filter assembly according to claim 21 wherein:
    (a) said protrusions project about 0.01–0.1 inches from said rim.

16. A filter assembly according to claim 15 wherein:
    (a) said protrusions project about 0.04 inches from said rim.

17. A filter assembly according to claim 9 wherein:
    (a) said rim includes no more than 6 protrusions.

* * * * *

UNITED STATES PATENT AND TRADEMARK OFFICE
CERTIFICATE OF CORRECTION

PATENT NO. : 6,096,208
DATED : August 1, 2000
INVENTOR(S) : Connelly et al.

It is certified that error appears in the above-identified patent and that said Letters Patent is hereby corrected as shown below:

<u>Column 6,</u>
Line 29, "3 and 6" should not be in bold print

Signed and Sealed this

Eighth Day of October, 2002

Attest:

Attesting Officer

JAMES E. ROGAN
*Director of the United States Patent and Trademark Office*